A. H. HOOK.
Sewing Machine.
No. 1,592. Reissued Dec. 15, 1863.
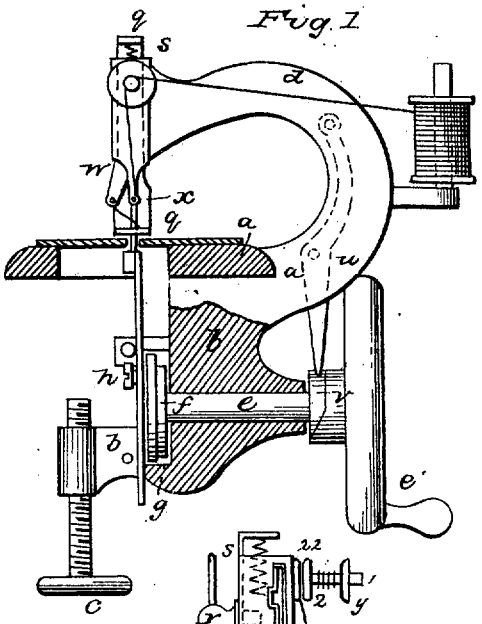
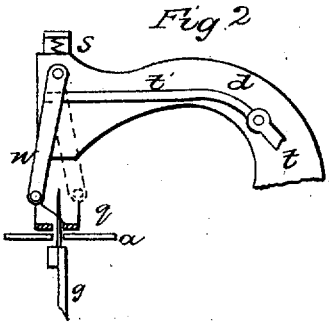
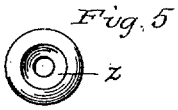
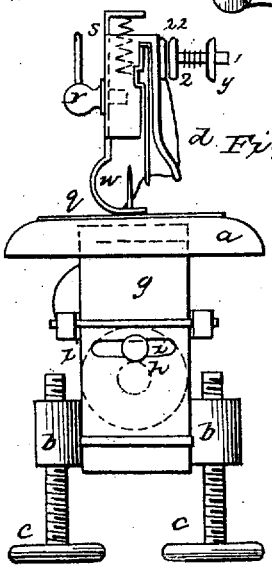
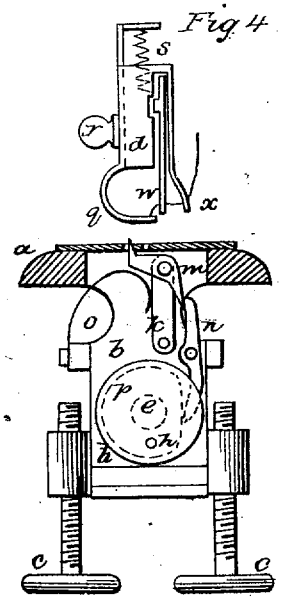
WITNESSES
Hartwell Loeser
F. W. Ritter
INVENTOR
William Stanley
Assignee
per S. D. Law
N. PETERS, Photo-Lithographer, Washington, D. C.

UNITED STATES PATENT OFFICE.

WILLIAM STANLEY, OF NEW YORK, N. Y., ASSIGNEE, BY MESNE ASSIGNMENTS, OF ALBERT H. HOOK, OF SAME PLACE.

IMPROVEMENT IN SEWING-MACHINES.

Specification forming part of Letters Patent No. 22,179, dated November 30, 1858; Reissue No. 1,592, dated December 15, 1863.

*To all whom it may concern:*

Be it known that ALBERT H. HOOK, of the city and State of New York, was the inventor of certain new and useful Improvements in Sewing-Machines; and I do hereby declare that the following is a full, clear, and exact description thereof and of the construction and operation of the same, reference being had to the accompanying drawings, and to the letters of reference marked thereon, and making a part of this specification.

Figure 1 is a sectional side elevation of the machine. Fig. 2 is a portion of the arm that holds down the cloth. Fig. 3 is a front view. Fig. 4 is a front sectional elevation. Fig. 5 is an enlarged view of the plates forming the thread-tension.

These improvements consist in simplifying and arranging the construction of certain parts of the machinery necessary to mechanical sewing, by which the machine can be made more compact and at a small cost, and still retain all the useful features of a single-thread sewing-machine, dispensing with threading, and overcoming other difficulties in its operation usually incident to such machines, and in the production of a new and improved thread-tension for regulating the tightness of the stitch.

The construction of the machine is as follows: A casting is made, consisting of a bed-plate, *a*, and having a part, *b*, projecting from its under side and extended so as to form a holdfast, by which it can be attached to a table or any suitable support by the set-screws *c c* to make it firm and steady. Above the table a curved arm, *d*, permanently fixed at the rear or back part of the table, curves over to the front, as is usual in many sewing-machines. This arm is hollow, for the purpose hereinafter described. A main shaft, *e*, passes through the projection *b*, having on its outer end a small fly-wheel with a crank, *e'*, by which motion is given to the machine. Motion can, however, be given by a belt, or in any convenient way. On the opposite end of such shaft *e* is a wheel, *f*, (or an arm may be substituted,) on which is a wrist-pin, *h*, by which the needle-bar is moved up and down. The needle-bar is a flat oblong plate, *g*, which slides up and down in a vertical position, or at right angles to the plate *a*, and below such plate, as is shown in the drawings. An oblong hole, *i*, is made across such plate or needle-bar, as shown in Fig. 3, in which the wrist-pin *h* plays sidewise as the wheel *f* revolves. The needle, which is a barbed one, and without any eye, is fixed to the top of the needle-bar *g*, and runs up through an opening in the plate *a* made for it, and so pierces the cloth in the act of sewing, as hereinafter described.

Directly behind the wheel *f*, on the end of the shaft *e*, is a cam, *p*, the form of which is represented by dotted lines in Fig. 4, which actuates the feed motion, as follows: An arm, *k*, is attached to the permanent projection *b* by a screw, *l*, that forms its pivot. To the upper end of this arm a bent lever or bell-crank piece, *m*, is pivoted at its angle, the horizontal arm of which has an upward projection at its upper end, that projects through a slot cut in the plate *a* and enters the cloth when feeding. Its opposite arm projects downward, and is struck and forced forward by the upper end of a lever, *n*, which is pivoted by its center to the projection *b*, and is moved by its lower end coming in contact with the cam *p*. A spring, *o*, bears against the arm *k*, and causes the parts to recede against the action of the cam, and the projection on the lever *m* to leave the cloth.

The action is as follows: The cam *p* throws outward the lower end of the lever *n*, which causes its upper end to move in an opposite direction, forcing forward the bent lever *m*, and thus raising the projecting points on its upper end, so as to push it into the cloth to be fed and carry that forward. The cloth is held down by a sliding piece, *q*, affixed to the arm *d*. This piece *q* is forced down and held upon the cloth by the set-screw *r*, and against it the projection on the upper end of the bent lever *m* strikes and prevents that from rising any higher. When the set-screw *r* releases the slide-piece *q* a spring, *s*, throws it up out of the way, as shown in Fig. 4, and releases the cloth. Fig. 3 represents this piece held down upon the cloth.

Within the hollow arm *d* a lever, *t*, plays, having its fulcrum at *u*, Fig. 1, the lower arm of which extends down to a face-cam, *v*, on the shaft *e*. The upper end of this lever has a connecting-rod, $t'$, Fig. 2, which connects it with a vibrating finger, $w$, or thread-guide, which is pivoted at its upper end to the head of the bent arm $d$, the rod $t'$ being connected with such thread-guide just below the point where it is so pivoted. In the lower end of this thread-guide is an eye, through which the thread from the spool passes after passing through a permanent eye, $x$, fixed to the arm $d$.

The tension of the thread is regulated by the use of two plates, $z\ z$, (one of which is shown in enlarged size in Fig. 5,) which are placed together, as shown in Fig. 3, fitting loosely upon a center pin, 1, and held or pressed together to any degree desired or found necessary by means of a spring, 2, the pressure of which is controlled by a set-nut, $y$. These plates or washers $z\ z$ are made concave at their centers, and are rounded off at their outer edges, and have a center perforation to pass onto the center pin, 1. The thread in coming from the spool is passed between these plates or washers, is then given a turn around the center pin, and afterward passes out from between such washers on its way to the eyes $x$ $w$ and the needle. By making these plates concave at their centers the thread is left free to travel around the center pin, and is prevented from riding or being in any way impeded as it passes around such center pin, and the rounding of the outer edges of these plates also facilitates the entrance and exit of the thread between such plates.

Any other suitable means than the spring 2 may be used to give the required pressure to the plates or washers $z\ z$, and any degree of pressure can be easily given them.

The plates or washers $z\ z$ may be made of steel, or any material which will permit the thread to pass between their surfaces, substantially as set forth.

The operation of the machine is as follows: When the cloth is in place, and the slide-piece $q$ is pressed down upon it, and the thread properly passed through the tension and guides, the needle is thrust upward through the cloth, as shown in Figs. 1, 2, 3. The thread-guide $v\ v$, which is in the position shown by the red lines in Fig. 2 while the needle ascends, is then brought into the position shown in Figs. 1, 2 and the thread brought close around the needle. When this descends the barb catches and carries down a loop of the thread through the cloth, which is then fed forward a stitch, when the needle again ascends, leaving the loop on it, and by the same process again catches the thread and draws down another loop through the first, and this is repeated as the sewing proceeds.

What is claimed as new, and is desired to be secured by Letters Patent, is—

1. The combination of the levers $m\ n$, arm $k$, spring $o$, and cam $p$, constructed and arranged substantially as and for the purpose set forth.

2. The combination of the two washers or plates $z\ z$, concave at the center and rounded at their outer edges, with a center pin and any suitable means to give such plates pressure, substantially as and for the purposes set forth.

WILLIAM STANLEY.

Witnesses:

ALONZO C. FARNHAM,
S. D. LAW.